(12) United States Patent
Demarco et al.

(10) Patent No.: US 6,604,376 B1
(45) Date of Patent: Aug. 12, 2003

(54) HEAT PUMP USING TREATED WATER EFFLUENT

(76) Inventors: Victor M. Demarco, P.O. Box 201057, Austin, TX (US) 78720; Louis M. Demarco, deceased, late of Austin, TX (US), by Victor M. Demarco, executor ( * ) Notice: Subject to any disclaimer, the term of this patent is extended or adjusted under 35 U.S.C. 154(b) by 0 days.

(21) Appl. No.: 09/689,161

(22) Filed: Oct. 12, 2000

Related U.S. Application Data

(63) Continuation-in-part of application No. 09/227,246, filed on Jan. 8, 1999.

(51) Int. Cl.[7] .................................. F25B 13/00
(52) U.S. Cl. .................... 62/324.1; 62/332; 62/506
(58) Field of Search ................... 62/506, 332, 324.1

(56) References Cited

U.S. PATENT DOCUMENTS

| | | | | |
|---|---|---|---|---|
| 2,241,070 A | | 5/1941 | McLenegan | 237/2 |
| 2,257,915 A | | 10/1941 | Newton | 257/3 |
| 2,260,477 A | | 10/1941 | Newton | 257/3 |
| 2,266,238 A | | 12/1941 | Newton | 257/3 |
| 2,461,449 A | | 2/1949 | Smith et al. | 62/129 |
| 2,466,460 A | | 4/1949 | Marshall | 62/3 |
| 2,477,351 A | | 7/1949 | Spofford | 62/6 |
| 2,713,252 A | | 7/1955 | Jackson | 62/6 |
| 2,807,145 A | | 9/1957 | Henderson | 62/3 |
| 2,863,299 A | | 12/1958 | Ammons | 627/157 |
| 3,275,067 A | | 9/1966 | Snaider | 165/29 |
| 3,466,889 A | | 9/1969 | Fristoe et al. | 62/184 |
| 3,550,677 A | | 12/1970 | Knowles | 165/1 |
| 3,815,378 A | | 6/1974 | Hoenisch | 62/184 |
| 4,065,937 A | * | 1/1978 | Burger et al. | 62/89 |
| 4,098,092 A | | 7/1978 | Singh | 62/238 |
| 4,238,933 A | | 12/1980 | Coombs | 62/238 |
| 4,279,128 A | | 7/1981 | Leniger | 62/238 |
| 4,308,723 A | | 1/1982 | Ecker | 62/235.1 |
| 4,311,191 A | | 1/1982 | VanderVaart | 165/29 |
| 4,327,560 A | * | 5/1982 | Leon et al. | 62/260 |
| 4,373,346 A | * | 2/1983 | Hebert et al. | 62/79 |
| 4,386,500 A | | 6/1983 | Sigafoose | 62/79 |
| 4,390,008 A | | 6/1983 | Andrews | 126/427 |
| 4,538,418 A | | 9/1985 | Lawrence et al. | 62/79 |
| 4,782,888 A | | 11/1988 | Bardenheier | 165/22 |
| 5,435,155 A | | 7/1995 | Paradis | 62/515 |
| 5,551,845 A | | 9/1996 | Milam | 417/290 |
| 5,689,966 A | * | 11/1997 | Zess et al. | 62/238.6 |
| 5,727,621 A | | 3/1998 | Hardin | 165/45 |
| 5,778,696 A | * | 7/1998 | Conner | 62/238.6 |
| 6,237,359 B1 | * | 5/2001 | Hebert | 62/348 |

FOREIGN PATENT DOCUMENTS

| | | |
|---|---|---|
| DE | 2846613 | 10/1978 |
| DE | 2834442 | 2/1980 |
| FR | 2299603 | 1/1975 |

\* cited by examiner

Primary Examiner—William C. Doerrler
Assistant Examiner—Mark S Shulman
(74) Attorney, Agent, or Firm—Thompson & Gustavson, L.L.P.

(57) ABSTRACT

A heat pump system (10) includes a fluid refrigerant compressor (12) and heat exchanger units (14, 16). Heat transfer tubings (36, 50, 58, 60, 66, 82) interconnect the fluid refrigerant compressor (12) and the heat exchanger units (14, 16) in a series relationship for carrying refrigerant fluid. Flow control valves (22, 24) are provided and are interconnected between a treated waste effluent source (20) such as a municipal or private treated waste effluent supply or reservoir and the heat exchanger unit (16) for controlling the amount of water flowing from the treated waste effluent source (20) to the heat exchanger unit (16). The flow control valves (22, 24) are responsive to the pressure at the outlet (12b) of the fluid refrigerant compressor (12) sensed at port (26) in the heat transfer tubing (58) to automatically optimize the operating condition of the heat pump system (10). To further optimize the heat pump system (10) in the heating mode, water from treated waste effluent source (20) flows through preheat exchanger (104) before entering heat exchanger unit (16).

11 Claims, 3 Drawing Sheets

HEAT PUMP USING TREATED WATER EFFLUENT

CROSS REFERENCE TO RELATED APPLICATIONS

This application is a continuation-in-part of U. S. patent application Ser. No. 09/227,246 filed Jan. 8, 1999.

TECHNICAL FIELD OF THE INVENTION

This invention relates to heat pumps, and more particularly to a water to air heat pump system which is automatically thermodynamically balanced to operate at optimum conditions using a variety of water sources, primarily from municipal water mains or privately owned water systems and preferably using treated water effluent such as gray water and reuse water, with the intent of returning used water to the water main or other source with absolutely no contamination or reduction in volume of water with only a slight temperature change.

BACKGROUND OF THE INVENTION

Although the heat pump principle is not new, extensive use of this energy concept in practical devices has only been recently accomplished. Now that energy conservation is of prime importance, greater use of heat pump systems is being made to save energy and achieve lower initial costs of heating and cooling equipment. Heat pumping in its simplest terms is described as pumping heat from a low energy level to a high energy level and using the resulting heat for space and domestic water heating.

Many forms of heat pump systems have been devised. These systems normally include a refrigerant fluid compressor that is interconnected with two heat exchanger units. The two heat exchanger units are alternatively operated as evaporators or condensers depending upon the positioning of a directional control valve in the interconnecting refrigerant fluid conduit for heating or cooling modes of operation. One heat exchanger unit is associated with heating or cooling apparatus, such as a fan and coil type condenser or evaporator. The other heat exchanger unit is operated to either add heat to the system or remove heat by dissipation.

An efficient mechanism to add or draw heat away from the heat pump system is to transfer heat between the heat exchanger unit of the heat pump system and a circulating loop of a heat transfer fluid, usually water. The question then arises how the change in the temperature of the water used to cool or heat the heat exchanger unit of the heat pump system is accommodated. The heat loss or gain in the water must be compensated for, or the water temperature will increase or decrease, as the case may be, beyond tolerable levels.

SUMMARY OF THE INVENTION

In accordance with the present invention, a heat pump system is provided which substantially eliminates the problems heretofore associated with water source heat pump systems, including lack of compensation for temperature variations in the water source. Preferably, the water source is treated water effluent such as gray water and reuse water, which is returned to the municipal or other source from which it came without contamination or reduction in volume.

In accordance with the present invention, a heat pump system is provided having a fluid refrigerant compressor. The heat pump system further includes first and second heat exchanger units. Fluid conduit interconnects the fluid refrigerant compressor and the first and second heat exchanger units in a series relationship.

In accordance with another aspect of the present invention, a heat pump system having two stages of operation for selectively heating and cooling is provided. The system includes a fluid refrigerant compressor having an inlet and an outlet and includes a refrigerant fluid. A first heat exchanger unit is operable as a condenser in the system for heating and as an evaporator in the system for cooling. A second heat exchanger unit includes a water source and is operable as an evaporator in the system for heating and as a condenser in the system for cooling mode. Fluid conduit is provided for interconnecting the fluid refrigerant compressor and the first and second heat exchanger units in a series relationship. The heat pump system further includes a valve interconnected in the fluid conduit intermediate the fluid refrigerant compressor and the first and second heat exchanger units for routing the refrigerant fluid in a first direction in the system heating mode of operation and in a second direction in the system cooling mode of operation through the first and second heat exchanger units in opposite directions.

BRIEF DESCRIPTION OF THE DRAWING

For a more complete understanding of the present invention and for further advantages thereof, reference is now made to the following Detailed Description, taken in conjunction with the accompanying Drawings in which.

DETAILED DESCRIPTION OF THE INVENTION

Figure 1:
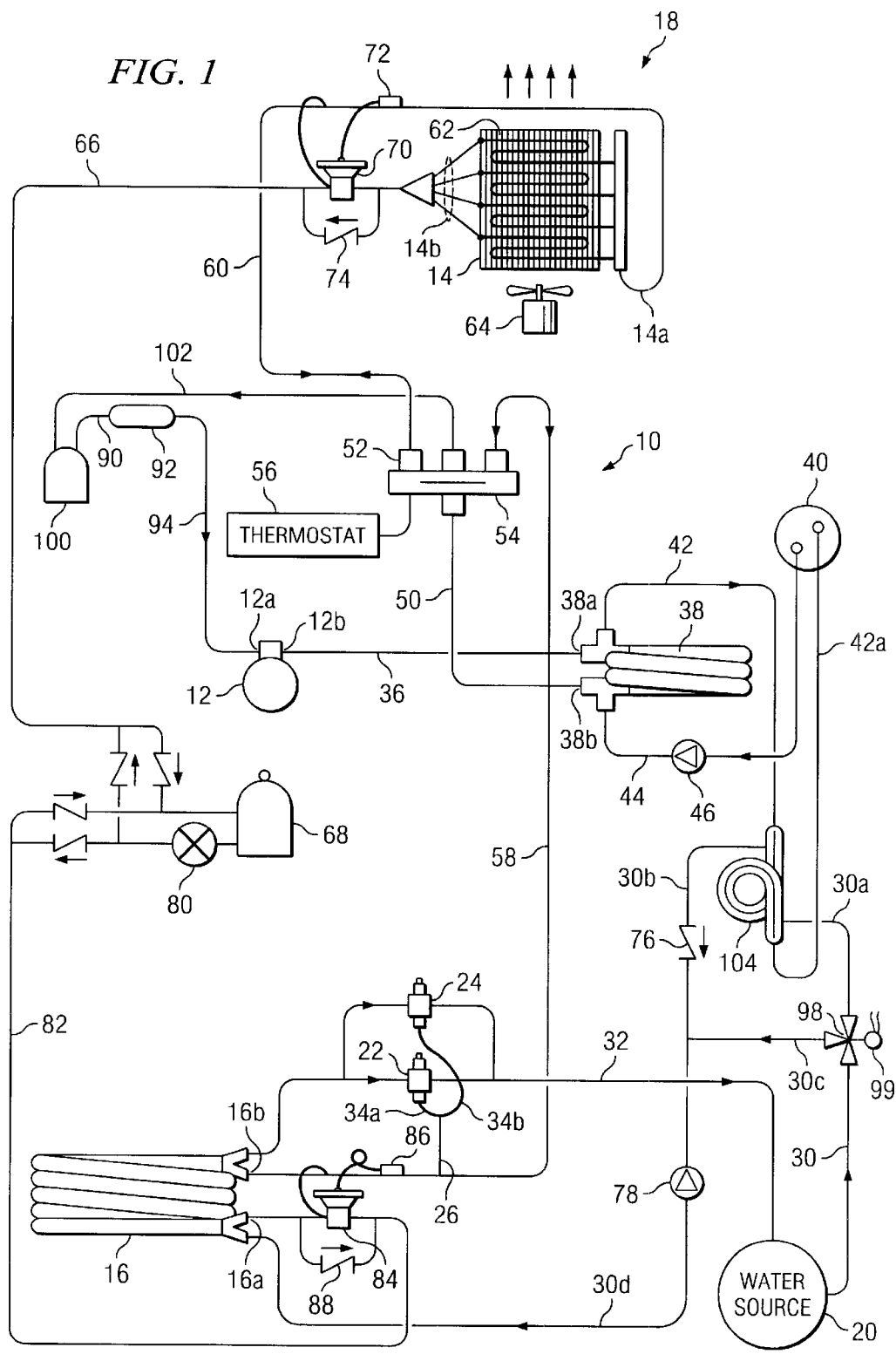
FIG. 1 is a schematic block diagram of the present heat pump system.

Referring to FIG. 1, a schematic block diagram of the present heat pump system is illustrated and is generally identified by the numeral 10. Heat pump system 10 includes a fluid refrigerant compressor 12 and two heat exchanger units 14 and 16. Heat exchanger unit 14 functions as a condenser in the heating mode and as an evaporator in the cooling mode of heat pump system 10 to heat or cool an air space 18. Heat exchanger unit 16 functions as an evaporator in the heating mode of operation and as a condenser in the cooling mode of operation of heat pump system 10 for receiving heat or transferring heat to water circulating through heat exchanger unit 16.

Water is supplied to heat exchanger unit 16 from a water source 20. An important aspect of the present invention is that water source 20 is provided from a city, town or development water main. The water is then returned directly into water source 20 with no contamination or reduction in volume taking place. Preferably, the water source 20 used is a source of treated waste effluent such as gray water and reuse water. Treated waste effluent is water that has not yet been sufficiently purified and clarified to be considered potable water. Because of water conservation demands, and water treatment costs, considerations have been given to providing treated waste effluent water lines to a residence or business for use in non potable water needs, such as toilet flushing, lawn watering and the like. Also, water source 20 may comprise, for example, a well, stream or a body of water such as an ocean or lake. Additionally, water source 20 may comprise a closed system such as an above ground or underground water storage tank or underground piping loop system.

Treated waste effluent water includes reclaimed water that has been defined as Type I and Type II reclaimed water. Type I reclaimed water is for uses including irrigation or other uses in areas where the public may be present during the time when irrigation takes place or other uses where the public may come into contact with the reclaimed water. The following conditions apply to Type I reclaimed water: $BOD_5$ or $CBOD_5$ of 5 mg/L, Turbidity 3 NTU, Fecal Coliform 20 CFU/100 ml (geometric mean), and Fecal Coliform (not to exceed) 75 CFU/100 ml (single grab sample). Type II reclaimed water is for use where the public would not come into contact with the reclaimed water. The following conditions apply to Type II reclaimed water: $BOD_5$ 20 mg/L, or $CBOD_5$ 15 mg/L, Fecal Coliform 200 CFU/100 ml (geometric mean), and Fecal Coliform (not to exceed) 800 CFU/100 ml (single grab sample). The use of reclaimed water is regulated by the states. Reclaimed water projects can be found in most states, and reclaimed water is used for irrigation, cooling tower make up water, fire fighting, industrial processes, and road construction. Although normally less involved, permitting is similar to that required for the use of potable water, and main pipe materials and tapping procedures are the same.

Flow control valves 22 and 24 are disposed between water source 20 and the circulating input to heat exchanger unit 16. Flow control valves 22 and 24 function to control the amount of water flowing from water source 20 to heat exchanger unit 16 depending upon the temperature of the water in water source 20. Flow control valves 22 and 24 are actuated by refrigerant pressure through port 26 from heat transfer tubing 58, which in turn are selectively actuated depending upon the mode of operation of heat pump system 10.

Water flows from heat exchanger 16 through flow control valve 22 in the heating mode of operation or through flow control valve 24 in the cooling mode of operation of heat pump system 10 through a conduit 32 to water source 20. Flow control valves 22 and 24 are pressure actuated and respond to pressure at port 26 in heat transfer tubing 58. Pressure changes in heat transfer tubing 58 are transmitted via fluid lines 34a and 34b to flow control valves 22 and 24, respectively. Flow control valve 22 operates to maintain a high level of energy in heat pump system 10 during the heating mode of operation and flow control valve 24 operates to maintain a low level of energy in the heat pump system 10 during the cooling mode of operation.

Fluid refrigerant compressor 12 is a positive displacement compressor which reduces the volume of refrigerant fluid such as, for example, freon gas through compression. Reduction of the volume of the refrigerant fluid also increases the temperature of the gas. For example, a 3.5 ton compressor develops gas having discharge temperature of approximately 219° F. and a discharge pressure of 298 p.s.i.g. The discharge gas from fluid refrigerant compressor 12 is in a condition referred to as superheat, meaning that the gas is at a high temperature and high pressure such that the temperature of the gas is above the temperature at which the gas will condense at that pressure.

The superheated refrigerant fluid flows through heat transfer tubing 36 to a domestic hot water coil 38 having an inlet 38a and outlet 38b. Domestic hot water coil 38 is interconnected to a hot water tank 40 via conduits 42 and 44. Water circulates under the control of a pump 46 disposed in conduit 44 between hot water tank 40 and domestic hot water coil 38. The superheated gas flowing from fluid refrigerant compressor 12 via heat transfer tubing 36 through domestic hot water coil 38 loses part of its superheat to the water stored in hot water tank 40. Domestic hot water coil 38 functions as a desuperheater to elevate the temperature of the water stored in hot water tank 40 regardless of the mode of operation of heat pump system 10.

High pressure, high temperature refrigerant fluid in the form of a gas flows from outlet 38b of domestic hot water coil 38 via heat transfer tubing 50 to a reversing valve 52. Reversing valve 52 includes a solenoid 54 whose operation is controlled by a thermostat 56. Depending upon the mode of operation of heat pump system 10, as controlled by thermostat 56, solenoid 54 will be actuated to direct the high pressure, high temperature gas in one of two directions. Reversing valve 52 will direct refrigerant fluid via heat transfer tubing 58 to heat exchanger unit 16 in the cooling mode of operation of heat pump system 10 and via heat transfer tubing 60 to heat exchanger unit 14 in the heating mode of operation in the heat pump system 10.

In the heating mode of operation of heat pump system 10, the hot refrigerant fluid passes via heat transfer tubing 60 to port 14a of heat exchanger unit 14. Heat exchanger unit 14 may comprise, for example, a fin type coil having fins 62. The heat contained within the refrigerant fluid circulating within heat exchanger unit 14 is removed to the air stream passing through fins 62 by operation of a fan 64 to thereby heat the air space 18. In passing through heat exchanger unit 14, the refrigerant fluid gas condenses to the liquid phase thereby releasing its latent heat to heat exchanger unit 14 and, in turn, to air space 18.

The refrigerant fluid now in the form of a liquid exits port 14b of heat exchanger unit 14 at high pressure and flows via heat transfer tubing 66 to a receiver tank 68. Receiver tank 68 acts as an accumulator for excess liquid during periods of any load fluctuations. Interconnected within heat transfer tubing 66 is a thermostatic expansion valve 70 having a temperature and pressure sensor 72 at port 14a of heat exchanger unit 14. Connected in parallel with thermostatic expansion valve 70 is a bypass valve 74. In the heating mode of operation of heat pump system 10, refrigerant fluid flows through bypass valve 74 to bypass thermostatic expansion valve 70.

The high pressure refrigerant in the form of a liquid flows from receiver tank 68 via heat transfer tubing 82 to port 16a of heat exchanger unit 16. Disposed within heat transfer tubing 82 is a thermostatic expansion valve 84 having a temperature and pressure sensor 86 interconnected at port 16b of heat exchanger unit 16. Interconnected in parallel across thermostatic expansion valve 84 is a bypass valve 88 which is not utilized in the heating mode of heat pump system 10. Also interconnected in heat transfer tubing 82 is a moisture indicator 80 which indicates sub-cooling with all liquid and no bubbles present in a sight glass contained in moisture indicator 80.

Thermostatic expansion valve 84 functions to reduce the refrigerant fluid pressure from the system's high pressure side to the low pressure side of thermostatic expansion valve 84, such that the refrigerant fluid flashes back to a vapor due to the rapid drop in pressure caused by thermostatic expansion valve 84. Heat exchanger unit 16 functioning as an evaporator furnishes the heat required by the change of state of the refrigerant fluid. Where fluid refrigerant compressor 12 is a 3.5 ton unit, heat exchanger unit 16 would operate at a refrigerant fluid temperature of about 45° F. and at 82 p.s.i.g. pressure. The pressure within heat pump system 10 is thereby reduced from the pressure at outlet 12b of fluid refrigerant compressor 12. Heat exchanger unit 16 acts as an evaporator and the heat required by the evaporation of the refrigerant fluid is furnished by the water circulating through heat exchanger 16 from water source 20.

As the pressure in the heat transfer tubing 58 at port 26 varies due to the temperature of the water stored within water source 20, the amount of water flowing from water source 20 to heat exchanger unit 16 will vary. The difference in the temperature of the water flowing from water source 20 into heat exchanger unit 16 affects the amount of heat removal that takes place in heat pump system 10 which is reflected through the balance of the system which will change the pressure in the heat transfer tubing 58 at port 26. This pressure change will modulate flow control valve 22 in the heating mode of operation of heat pump system 10 so that the heat balance and thermodynamic balance of heat pump system 10 will automatically be adjusted. In the heating mode of operation of heat pump system 10, as the temperature of water source 20 decreases, more water is necessary to maintain the thermodynamic balance within heat pump system 10 and therefore flow control valve 22 allows more water to circulate through heat exchanger unit 16 to thereby extract more heat from the circulating water.

An important aspect of the present system is the use of preheat exchanger 104 and the 3-way solenoid valve 98. The purpose for the preheat exchanger 104 is to maintain the temperature of source water 20 entering the heat exchanger 16 above approximately 45° F. to enable the heat pump system 10 to function efficiently at low source water 20 temperature. Low source water 20 temperature will exist as low as 34° F. during the winter in city water mains, lakes, rivers and above-ground holding tanks, thus necessitating the use of preheat exchanger 104 which will raise the temperature of incoming water from 5° F. to 20° F. depending on the flow of water regulated by flow control valve 22.

Preheat exchanger 104 is used in the heating mode of heat pump system 10. This necessitates the use of 3-way solenoid valve 98 to bypass the preheat exchanger 104 in the cooling mode of heat pump system 10. The 3-way solenoid valve 98 is controlled by the thermostat 99.

During the heating mode of heat pump system 10, the source water 20 flows via conduit 30, through 3-way solenoid valve 98, via conduit 30a through pre-heat exchanger 104, via conduit 30b, through check valve 76, through circulating pump 78, via conduit 30d to heat exchanger 16.

During the cooling mode of heat pump system 10, the source water 20 flows via conduit 30, through 3-way solenoid valve 98, via conduit 30c, through circulating pump 78, via conduit 30d, to heat exchanger 16.

Heat for preheat exchanger 104 is supplied by hot water that was heated by superheated refrigerant in domestic hot water coil 38. This hot water flows from domestic hot water coil 38 via conduit 42, through preheat exchanger 104, via conduit 42a, to hot water tank 40.

Refrigerant fluid in the form of gas flows from port 16b of heat exchanger unit 16 via heat transfer tubing 58 back to reversing valve 52 at low pressure. Reversing valve 52 now causes the refrigerant fluid to flow via heat transfer tubing 102 to suction line accumulator 100 for any excess liquid during periods of any load fluctuation. The low pressure gas flows via heat transfer tubing 90 to a filter-drier 92 which cleans and dries the refrigerant fluid for return to inlet 12a of fluid refrigerant compressor 12 via heat transfer tubing 94.

In the cooling mode of operation of heat pump system 10, the refrigerant fluid from fluid refrigerant compressor 12 passes through domestic hot water coil 38 which functions in the same manner as in the heating mode of operation of heat pump system 10 previously described. The high pressure, high temperature refrigerant fluid passes through heat transfer tubing 50 to reversing valve 52. Reversing valve 52 functions in the cooling mode to route the flow of refrigerant fluid through heat transfer tubing 58 to heat exchanger unit 16 at port 16b. Heat exchanger unit 16 now functions as a condenser, such that the refrigerant fluid gives up its heat to the water circulating within heat exchanger unit 16 and thereby becomes a liquid at high pressure. The thermodynamic balance of heat pump system 10 is maintained by flow control valve 24 modulating the water flow from water source 20 in response to pressure and temperature variations of the heat transfer tubing 58 via port 26.

The refrigerant exiting port 16a of heat exchanger unit 16 in the form of a liquid passes to receiver tank 68 via bypass valve 88 and heat transfer tubing 82. The refrigerant fluid then passes through moisture indicator 80 and then heat transfer tubing 66 to thermostatic expansion valve 70. Thermostatic expansion valve 70 functions to reduce the pressure of the refrigerant fluid from, for example, 298 p.s.i.g. at 219° F. to 82 p.s.i.g. pressure at 45° F. for the example where a 3.5 ton fluid refrigerant compressor 12 is utilized.

With the reduction in pressure caused by thermostatic expansion valve 70, the refrigerant fluid passes from a liquid state to a gas state. The gas passes through heat exchanger unit 14 from port 14b to port 14a. Heat exchanger unit 14 now functions as an evaporator to thereby remove heat passing through the fins 62 and thereby cool air space 18.

The refrigerant fluid is then transferred by heat transfer tubing 60 to reversing valve 52 which diverts the refrigerant fluid in the form of a gas at low pressure via heat transfer tubing 102 to suction line accumulator 100 and via heat transfer tubing 90 to filter-drier 92. The gas then flows from filter-drier 92 via heat transfer tubing 94 to inlet 12a of fluid refrigerant compressor 12.

It therefore can be seen that in the cooling mode of operation of heat pump system 10, flow control valve 24 functions to modulate the flow of water from water source 20 to ensure the proper flow of water based upon the amount of heat to be extracted or transferred to the water within water source 20. Flow control valve 24 is operated in response to pressure at port 26 from heat transfer tubing 58 to ensure that heat pump system 10 is contained in an equilibrium to operate at optimum efficiency conditions. As the temperature of the water from water source 20 decreases, less water is needed for heat exchanger unit 16 in the cooling mode of operation of heat pump system 10. It therefore can be seen that flow control valves 22 and 24 operate in opposite directions for increasing or decreasing the flow of water from water source 20 to heat exchanger unit 16.

It therefore can be seen that the present heat pump system 10 operates to place the system automatically in thermodynamic balance to operate at optimum operating conditions independent of the temperature of the water or air utilized as the energy source.

Figure 2:
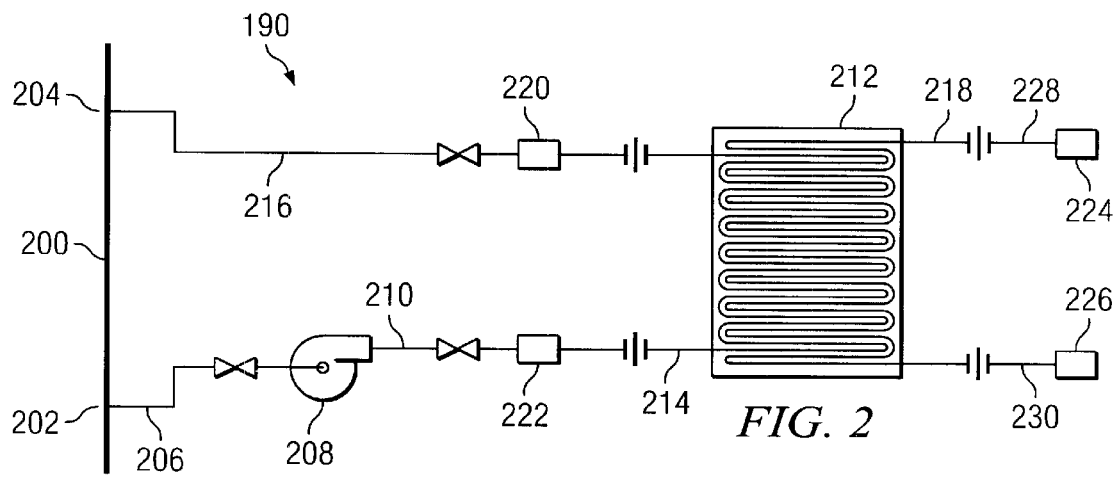
FIG. 2 is a primary loop schematic.
Figure 4:
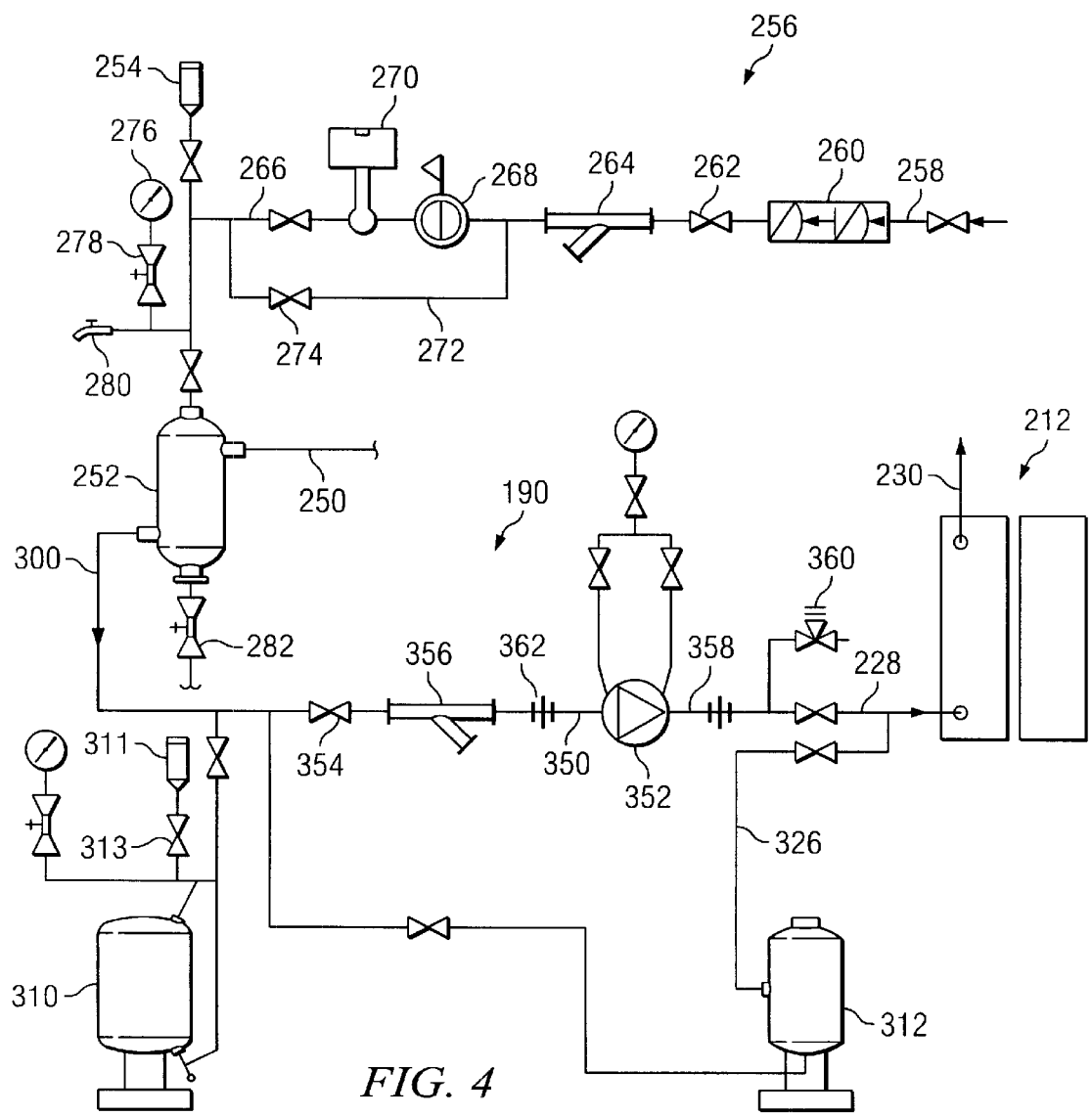
FIG. 4 is a secondary loop pump piping schematic with in line pumps up to 200 tons.
Figure 3:
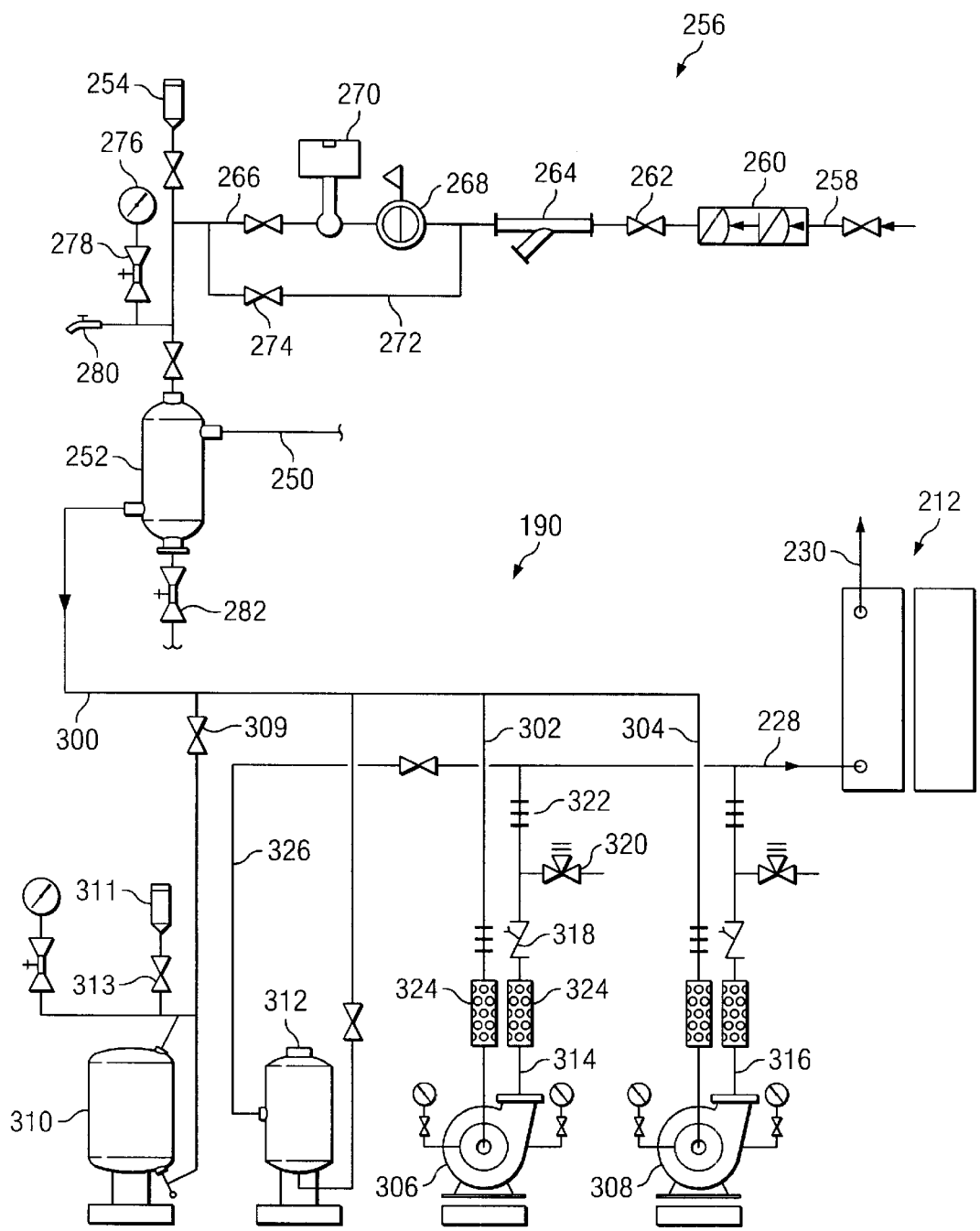
FIG. 3 is a secondary loop pump piping schematic with base mounted pumps for 20 tons and up.

With reference now to FIGS. 2–4, a heat pump system 190 forming a second embodiment of the present invention will be described. Heat pump system 190 is designed for use in an environment, such as an office, which has multiple heat pumps 10 to condition different areas of the building. Of course, heat pump system 190 can also be used with just a single heat pump 10. The heat pump system 190 has a primary loop for water flow from the water source 20 which flows through the primary side of a dedicated heat exchanger 212. A secondary loop containing a heat transfer liquid, such as water with anti-freeze, flows through the secondary side of the heat exchanger 212 and is connected to the heat exchanger units 16 of each of the heat pumps 10 in series. One advantage of such a system is that in a structure with different climate zones, it may be only necessary to remove heat from one zone and transfer it to another zone by use of the liquid in the secondary loop. In such a case no net heat transfer would occur between the primary loop and the secondary loop and circulation would not be required in the primary loop, allowing the primary loop pump to be off to save energy.

FIG. 2 illustrates the primary loop with a water main 200 which is connected to the water source 20. Taps 202 and 204 are made into the water main 200, with the supply tap 202 being upstream of the return tap 204. It is desirable to place the supply and return taps as far apart as possible, to avoid short circuiting of the primary loop water. Typically, the taps have a head loss of 1–9 feet.

A supply line 206 extends from the supply tap 202 to the inlet of a supply pump 208. The pump acts to draw water from the water main 200 and discharge it into discharge line 210 which enters the inlet side 214 of a heat exchanger 212. The water flows through the inlet side 214 of the heat exchanger and is discharged into return line 216 for return to the water main at return tap 204. The inlet side 214 does not permit flow of the water from the water main 200 to the outlet side 218 of the heat exchanger. Only thermal energy can be transferred between the inlet side 214 and the outlet side 218, thus protecting the water in the water main from any contamination from the system. Temperature probes 220–226 can be used in the discharge line 210 and return line 216 and in the inlet line 228 and return line 230 of the outlet side 218 to monitor the temperatures. Preferably, supply line 206 is sized for 1–3 foot head loss per 100 feet equivalent length.

With reference now to FIG. 3, a typical secondary loop pump piping for base mounted pumps, 20 tons and up is illustrated. The discharge line 230 extends from the outlet side 218 of heat exchanger 212 to the heat pump or pumps 10 (not shown) to provide heat to or remove heat from the heat exchanger units 16 as needed. From the heat pumps 10, the working fluid in the secondary loop, typically water, passes through return 250 to an air separator 252, which acts to remove any air from the working fluid and discharge it through high capacity air vent 254 with valve.

A working fluid make-up system 256 is also used. If working fluid is lost from the system, it will be replaced by working fluid in the make up water line 258, which passes through a reduced pressure principle back flow preventor 260, a ball valve 262 and a strainer 264. The make-up fluid then flows through a line 266 having an automatic fill valve 268 and a water meter 270 to monitor make-up flow. A by pass line 272 with a bypass valve 274 can be used to permit water make-up flow to the separator without passing through the water meter 270, if desired.

The air separator 252 also preferably mounts a pressure gauge 276 with a shut off valve 278 and boiler drain 280. The air separator also preferably has a drain 282 with cap.

From the separator 252, the working fluid passes through line 300 to the inlets 302 and 304 of primary pump 306 and back-up pump 308 which circulate the working fluid in the secondary loop. Line 300 is also connected to a bladder type expansion tank 310 through a ball valve 309 with the handle locked open. The expansion tank 310 prevents over pressure conditions in the secondary loop. The design operating pressures at the tank should be 20 psi minimum and 27 psi maximum. The tank 310 has a pressure bladder therein that is compatible with propylene glycol and has a high capacity air vent 311 with valve 313. Line 300 is also connected to the inlet of a by-pass feeder 312.

The discharge lines 314 and 316 of pumps 306 and 308 connect to the return line 228 to the heat exchanger 212 through triple duty valves 318, pressure relief valves 320 and butterfly valves 322. Vibration absorbers 324 isolate the vibration of pumps 306 and 308 from the remainder of the system. The outlet line 326 of the by-pass feeder 312 also connects to the return line. The pressure relief valves should be set to a pressure at least 10 psi below, and preferably 20 psi below, the pressure in the primary loop with water from the water source 20. This acts to prevent a leak from the secondary loop into the primary loop.

With reference to FIG. 4, a typical secondary loop pump piping for in line pumps up to 200 tons is illustrated. Many components are the same as shown in FIG. 3 and are identified with the same reference numerals. However, in the piping of FIG. 4, the line 300 connects to the inlet line 350 of a single circulating pump 352 which circulates the working fluid in the secondary loop. A shut off valve 354 and strainer 356 with boiler drain are positioned in the inlet line 350. The outlet line 358 of the pump 352 connects to the return line 228 and includes a pressure relief valve 360. Union or pump flanges 362 permit the pump 352 to be removed for servicing and replacement. The outlet line 326 of the by-pass feeder 312 is connected directly into the return line 228.

For optimal system efficiency, the source water temperatures should be between 45 F. (In the heating season) and 80 F. (In cooling season). Water main temperatures are usually within this range, but must be verified to ensure efficient, reliable system operation. If water temperatures are outside this range, the system will still operate, but additional flow will be needed, and system efficiency will be reduced.

To minimize pumping power consumption and cost, the total supply and return head loss should be ten feet or less.

The heat exchanger 212 is a key element in the system, which ensures that no cross contamination of the water supply system can take place. To prevent the possibility of cross contamination by mixing of water between the primary and secondary sides of the heat exchanger, vented double wall construction is preferred. All components of the heat exchanger in contact with the water source 20 should be of materials rated and approved for such use. That requirement includes the gasket material in a plate and frame heat exchanger and the soldering or brazing material in a tube in tube heat exchanger. Also, the secondary loop should preferably be at a pressure of 20 or more psi lower that the pressure in the primary loop to reduce the chances of contamination.

The primary loop pump 208 circulates water from the main, through the intermediate heat exchanger 212, and back to the main. It must be constructed of materials rated and approved for use in contact with the water from water source 20. The pump should be selected based on the desired flow rate and total head loss of the primary loop. A variable frequency drive(VFD) on the pump 208 can save operating costs on pumps of 5 HP and greater. One suggested control sequence is to control the VFD by a temperature sensor in the circulated water leaving the heat exchanger in line 216. On a rise in leaving water temperature above 75 F.

(Adjustable) the pump speed shall increase to maintain 75 F. (Adjustable) leaving water temperature. A dead band would exist between 75 F. (Adjustable) and 50 F. (Adjustable) where the pump shall not run. On a fall in leaving water temperature below 50 F. (Adjustable), the pump speed increases to maintain 50 F. (Adjustable) leaving water temperature. As noted, when multiple heat pumps 10 are connected to the secondary loop, it may be possible to transfer heat from just one conditioned zone to another to maintain both zones at the desired temperature. In such an event, the primary loop pump would not need to be operated and the temperature of the water in the primary loop would be in the dead band.

In the secondary loop of the system, it may be desirable to use antifreeze. For piping, PVC and copper are commonly used. Steel pipe is not recommended in the secondary loop because dielectric unions are necessary where transitioning to other metals and water treatment chemicals are necessary for corrosion prevention. Pipes should be sized to minimize pumping cost, so design head losses between 1 and 3 feet head per hundred feet equivalent length are desirable.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A heat pump system comprising:
    heat exchanger means; and
    fluid conduit means for supplying pressurized water from a reuse water reservoir to said heat exchanger means such that reuse water is supplied to said heat exchanger means and returned directly to said reservoir of reuse water without contamination or reduction in volume of said reuse water reservoir.

2. The heat pump system of claim 1 wherein the reuse water reservoir is a municipal reuse water reservoir.

3. The heat pump system of claim 1 wherein the reuse water reservoir is a private reuse water reservoir.

4. A heat pump system comprising:
    a fluid refrigerant compressor having an inlet and outlet and including refrigerant fluid;
    first heat exchanger means;
    second heat exchanger means including a connection to a reuse water source;
    preheat exchanger means interconnected between said reuse water source and said second heat exchanger means for preheating the reuse water from said reuse water source;
    fluid conduit means for interconnecting said fluid refrigerant compressor and said first and said second heat exchanger means in series relationship and for carrying said refrigerant fluid; and
    flow control valve means interconnected between said reuse water source and said second heat exchanger means for controlling the amount of water flowing from said reuse water source to said second heat exchanger means, said flow control valve means being responsive to the pressure at the outlet of said fluid refrigerant compressor to automatically optimize the operating condition of the system.

5. The heat pump system of claim 4 and further including:
    selectively operable valve means interconnected to said fluid conduit means intermediate said fluid refrigerant compressor and said first and second heat exchanger means for alternatively routing the flow of said refrigerant fluid through said first and said second heat exchanger means in opposite directions.

6. The heat pump system of claim 4 wherein said first heat exchanger means includes fin type coil means.

7. The heat pump system of claim 4 and further including:
    reuse water heating means interconnected in said fluid conduit means between said outlet of said fluid refrigerant compressor and said first and said second heat exchanger means.

8. The heat pump system of claim 4 wherein said reuse water source comprises a city water supply.

9. A heat pump system having two modes of operation for selectively heating and cooling an air space comprising:
    a fluid refrigerant compressor having an inlet and an outlet and including a refrigerant fluid;
    first heat exchanger means being operable as a condenser in the system heating mode of operation and as an evaporator in the system cooling mode of operation;
    second heat exchanger means including a reuse water source and being operable as an evaporator in the system heating mode of operation and as a condenser in the system cooling mode of operation;
    a preheat exchanger means interconnected between said reuse water source and said second heat exchanger means for preheating the reuse water from said reuse water source;
    fluid conduit means for interconnecting said fluid refrigerant compressor and said first and said second heat exchanger means in series relationship and for carrying said refrigerant fluid;
    selectively operable valve means interconnected in said fluid conduit means intermediate said fluid refrigerant compressor and said first and said second heat exchanger means for routing said refrigerant fluid in a first direction in the system heating mode of operation and in a second direction in the system cooling mode of operation through said first and said second heat exchanger means in opposite directions;
    first flow control valve means interconnected between said preheat exchanger and said second heat exchanger means for controlling the amount of water flowing from said reuse water source to said second heat exchanger means in the system heating mode of operation;
    second flow control valve means interconnected between said reuse water source and said second heat exchanger means for controlling the amount of water flowing from said reuse water source to said second heat exchanger means in the system cooling mode of operation; and
    said first and said second flow control valves being responsive to the pressure at the outlet of said fluid refrigerant compressor to thereby automatically optimize the operating condition of the system in the heating and cooling modes of operation.

10. The heat pump system of claim 9 wherein said selectively operable valve means includes:
    first expansion valve means disposed in said fluid conduit means for providing a path for said refrigerant fluid in the system cooling mode of operation for refrigerant fluid flowing from said second heat exchanger means to said first heat exchanger means;
    first bypass valve means interconnected in parallel with said first expansion valve means for providing a path for said refrigerant fluid in the system heating mode of operation for refrigerant fluid flowing from said first heat exchange means to said second heat exchange means;

second expansion valve means disposed in said fluid conduit means for providing a path for said refrigerant fluid in the system heating mode of operation for refrigerant fluid flowing from said first heat exchanger means to said second heat exchanger means; and second bypass valve means interconnected in parallel with said second expansion valve means for providing a path for said refrigerant fluid in the system cooling mode of operation for refrigerant fluid flowing from said second heat exchanger means to said first heat exchanger means.

11. The heat pump system of claim 9 and further including:

reuse water heating means interconnected in said fluid conduit means between said outlet of said fluid refrigerant compressor and said first and said second heat exchanger means.

* * * * *